(12) United States Patent
Shand

(10) Patent No.: US 12,332,384 B2
(45) Date of Patent: *Jun. 17, 2025

(54) SHOT REORDERING IN LIDAR SYSTEMS

(71) Applicant: Waymo LLC, Mountain View, CA (US)

(72) Inventor: Mark Alexander Shand, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 18/063,993

(22) Filed: Dec. 9, 2022

(65) Prior Publication Data

US 2023/0108351 A1    Apr. 6, 2023

Related U.S. Application Data

(63) Continuation of application No. 16/227,341, filed on Dec. 20, 2018, now Pat. No. 11,543,495.

(Continued)

(51) Int. Cl.
*G01S 7/484* (2006.01)
*G01S 7/481* (2006.01)
(Continued)

(52) U.S. Cl.
CPC ............ *G01S 7/484* (2013.01); *G01S 7/4815* (2013.01); *G01S 7/4865* (2013.01); *G01S 17/931* (2020.01); *G01S 17/10* (2013.01)

(58) Field of Classification Search
None
See application file for complete search history.

(56) References Cited

U.S. PATENT DOCUMENTS

| 5,621,514 A | 4/1997 | Paranto et al. |
| 8,072,582 B2 | 12/2011 | Meneely |

(Continued)

FOREIGN PATENT DOCUMENTS

| CN | 105143820 A | 12/2015 |
| CN | 107037445 A | 8/2017 |

(Continued)

OTHER PUBLICATIONS

Gunzung Kim and Yongwan Park, "Independent Biaxial Scanning Light Detection and Ranging System Based on Coded Laser Pulses without Idle Listening Time", Sep. 4, 2018, Sensors 2018, 18, 2943.

(Continued)

*Primary Examiner* — Luke D Ratcliffe
(74) *Attorney, Agent, or Firm* — MCDONNELL BOEHNEN HULBERT & BERGHOFF LLP

(57) ABSTRACT

Systems and methods described herein relate to LIDAR systems and their operation. An example method includes partitioning a plurality of light-emitter devices into a plurality of groups. Each light-emitter device is associated with a given group of the plurality of groups. The method also includes selecting a group from the plurality of groups according to a predetermined group order and selecting one or more light-emitter devices from the plurality of light-emitter devices of the selected group according to a firing order. The method yet further includes, at a predetermined shot dither time, causing the selected light-emitter device to emit at least one light pulse. The predetermined shot dither time is based on a shot dither schedule. The method may additionally include repeating the method to provide a complete scan in which each light-emitter device of the plurality of light-emitter devices has emitted at least one light pulse.

20 Claims, 12 Drawing Sheets

Related U.S. Application Data

(60) Provisional application No. 62/753,957, filed on Nov. 1, 2018.

(51) Int. Cl.
    *G01S 7/4865*     (2020.01)
    *G01S 17/10*     (2020.01)
    *G01S 17/931*     (2020.01)

(56) References Cited

U.S. PATENT DOCUMENTS

| | | | |
|---|---|---|---|
| RE46,672 E | 1/2018 | Hall | |
| 11,269,063 B1 * | 3/2022 | Bendickson | G01S 17/894 |
| 11,543,495 B2 | 1/2023 | Shand | |
| 2003/0048819 A1 | 3/2003 | Nagano et al. | |
| 2012/0001953 A1 | 1/2012 | Hirakata et al. | |
| 2015/0160341 A1 | 6/2015 | Akatsu et al. | |
| 2015/0185325 A1 | 7/2015 | Park et al. | |
| 2016/0047891 A1 | 2/2016 | Campbell et al. | |
| 2017/0184450 A1 | 6/2017 | Doylend et al. | |
| 2017/0269198 A1 | 9/2017 | Hall et al. | |
| 2017/0269209 A1 | 9/2017 | Hall et al. | |
| 2017/0299722 A1 * | 10/2017 | Ouyang | G01S 7/4808 |
| 2018/0081041 A1 | 3/2018 | Niclass et al. | |
| 2018/0259623 A1 * | 9/2018 | Donovan | G01S 7/497 |
| 2018/0267152 A1 | 9/2018 | McMichael et al. | |
| 2019/0056497 A1 * | 2/2019 | Pacala | G01S 7/4816 |
| 2019/0120967 A1 | 4/2019 | Smits | |
| 2021/0318434 A1 | 10/2021 | Pacala et al. | |

FOREIGN PATENT DOCUMENTS

| | | |
|---|---|---|
| JP | 2012-032792 A | 2/2012 |
| JP | 2015-129734 A | 7/2015 |
| KR | 10-2015-0076760 A | 7/2015 |
| KR | 10-2018-0049937 A | 5/2018 |

OTHER PUBLICATIONS

International Searching Authority, International Search Report and Written Opinion dated Aug. 10, 2010, in connection with International Patent Application No. PCT/US2019/057422, filed on Oct. 22, 2019, 10 pages.

* cited by examiner

| Group # | Firing Slot # | Shot Dither (ns) |
|---|---|---|
| 1 | 1 | 23 |
| 1 | 2 | 41 |
| 1 | 3 | 18 |
| 1 | 4 | 0 |
| 1 | 5 | 12 |
| 1 | 6 | 50 |
| 1 | 7 | 3 |
| 1 | 8 | 39 |
| 2 | 1 | 5 |
| 2 | 2 | 45 |
| 2 | 3 | 13 |
| 2 | 4 | 1 |
| 2 | 5 | 48 |
| 2 | 6 | 7 |
| 2 | 7 | 27 |
| 2 | 8 | 26 |
| ⋮ | ⋮ | ⋮ |

Figure 4A

SHOT REORDERING IN LIDAR SYSTEMS

CROSS-REFERENCE TO RELATED APPLICATION

The present application is a continuation of U.S. patent application Ser. No. 16/227,341, filed Dec. 20, 2018, which claims the benefit of U.S. Patent Application No. 62/753,957, filed Nov. 1, 2018. The foregoing applications are incorporated herein by reference.

BACKGROUND

Unless otherwise indicated herein, the materials described in this section are not prior art to the claims in this application and are not admitted to be prior art by inclusion in this section.

Light Detection and Ranging (LIDAR or lidar) systems emit light pulses into their environment according to a predetermined light pulse schedule. As an example, some LIDAR systems emit light pulses (or shots) from a plurality of light-emitter devices according to a predetermined frequency and in a predetermined light-emitter order, with a constant time delay between temporally-adjacent shots. However, such periodic light pulse schedules can allow for greater susceptibility to aliasing (e.g., misidentification of a range associated with a given shot) and intentional interference from an attacker.

Introducing an additional pseudorandom time delay (shot dither) between laser shot emissions can mitigate the risks of range aliasing and interference. The greater the variability in pseudorandom delay, the more such risks can be reduced. However, overextending the variability of pseudorandom delay can have drawbacks. For example, in order to obtain an unambiguous interpretation of a return signal up to a given predetermined distance, a receiver may wait for a corresponding listening window time between shots. As a result, adding a large pseudorandom shot dither component can reduce the overall LIDAR system shot rate. Accordingly, there exists a need for methods and systems that reduce the risk of LIDAR interference while reducing the negative impacts on LIDAR system performance.

SUMMARY

Systems and methods described herein relate to LIDAR systems and methods of their operation.

In a first aspect, a system is provided. The system includes a plurality of light-emitter devices partitioned into a plurality of groups. Each light-emitter device is associated with a given group of the plurality of groups. Each group includes light-emitter devices disposed within a respective contiguous region. The system also includes a controller that carries out operations. The operations include causing each of the plurality of light-emitter devices to emit an impulse. The impulse includes at least one light pulse. The plurality of the impulses is emitted from the plurality of light-emitter devices based on a firing order. Between temporally-adjacent impulses emitted from light-emitter devices in a given group, an impulse from a light-emitter device in at least one other group is timed to occur. Between temporally-adjacent impulses emitted from a given light-emitter device, an impulse from every other light-emitter device in the same group is timed to occur.

In a second aspect, a system is provided. The system includes a plurality of light-emitter devices partitioned into a plurality of groups. Each light-emitter device is associated with a given group of the plurality of groups. Each group includes light-emitter devices disposed within a respective contiguous region. The system also includes a controller. The controller carries out operations including causing each of the plurality of light-emitter devices to emit an impulse. The impulse includes at least one light pulse. The plurality of the impulses is emitted from the plurality of light-emitter devices based on a firing order. Between temporally-adjacent impulses emitted from light-emitter devices in a given group, an impulse from a light-emitter device in at least one other group is timed to occur. Between temporally-adjacent impulses emitted from a given light-emitter device, an impulse from at least one other light-emitter device in the same group is timed to occur.

In a third aspect, a method is provided. The method includes causing each light-emitter device of a plurality of light-emitter devices to emit an impulse. The plurality of light-emitter devices are partitioned into a plurality of groups. Each group includes light-emitter devices disposed within a respective contiguous region. Each impulse includes at least one light pulse. The plurality of impulses is emitted from the plurality of light-emitter devices based on a firing order. Between temporally-adjacent impulses emitted from light-emitter devices in a given group, an impulse from a light-emitter device in at least one other group is timed to occur. Between temporally-adjacent impulses emitted from a given light-emitter device, an impulse from at least one other light-emitter device in the same group is timed to occur.

In a fourth aspect, a device is provided. The device includes a transmitter, a controller, and a receiver. The controller is configured to obtain a sequence of scans of a field-of-view (FOV). For a first scan of the sequence of scans, the controller causes the transmitter to emit a first plurality of impulses toward the FOV, where each impulse includes at least one light pulse, such that: (i) the transmitter emits one or more impulses in the first plurality of impulses toward a first section of the FOV; (ii) the transmitter emits one or more other impulses in the first plurality of impulses toward a second section of the FOV; and (iii) the transmitter emits each impulse toward the second section of the FOV subsequent to emitting a respective impulse toward the first section of the FOV. The receiver intercepts light from the FOV.

In a fifth aspect, a system is provided. The system comprises a plurality of light-emitter devices that includes at least a first group of light-emitter devices and a second group of light-emitter devices. The system is configured to direct light emitted by the first group of light-emitter devices toward a first section of a field-of-view (FOV) and to direct light emitted by the second group of light-emitter devices toward a second section of the FOV. The system also comprises a controller that carries out operations. The operations comprise causing, in a particular order, each of the plurality of light-emitter devices to emit light. Each of the light-emitter devices in the first group of light-emitter devices is subsequent to, in the particular order, a respective light-emitter device in the second group of light-emitter devices.

Other aspects, embodiments, and implementations will become apparent to those of ordinary skill in the art by reading the following detailed description, with reference where appropriate to the accompanying drawings.

BRIEF DESCRIPTION OF THE DRAWINGS

FIG. 4A illustrates a shot dither schedule, according to an example embodiment.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In the present disclosure, a lidar system and method may include, on any shot, flexibly choosing between a plurality of possible emitters from which to emit the next shot. That is, the lidar system can reorder shots. This may be used to reduce potential impacts to overall system shot rate, for example.

In an example embodiment, the plurality of light-emitter devices may be partitioned into groups. The partitioning could be based on an arrangement of the light-emitter devices on a two-dimensional plane or surface. For example, the two-dimensional plane/surface may be divided up into regions, and light-emitter devices that are located within a given region could be assigned to a corresponding group. In some embodiments, between 5 and 20 light-emitter devices could be assigned to each group, although other ranges are possible and contemplated.

In some embodiments, each light-emitter device could be coupled to a respective pulser circuit. The pulser circuits could include hardware to enable a firing current or voltage pulse to the light-emitter device, causing it to emit a light pulse.

In the present disclosure, a firing order of light-emitter devices in a given group can include at least one out-of-order permutation (e.g., an instance of shot reordering). By reordering shots, overall complete scan times can be reduced because variable shot times can be more flexibly intermingled.

II. Example Systems and Devices

Figure 1:
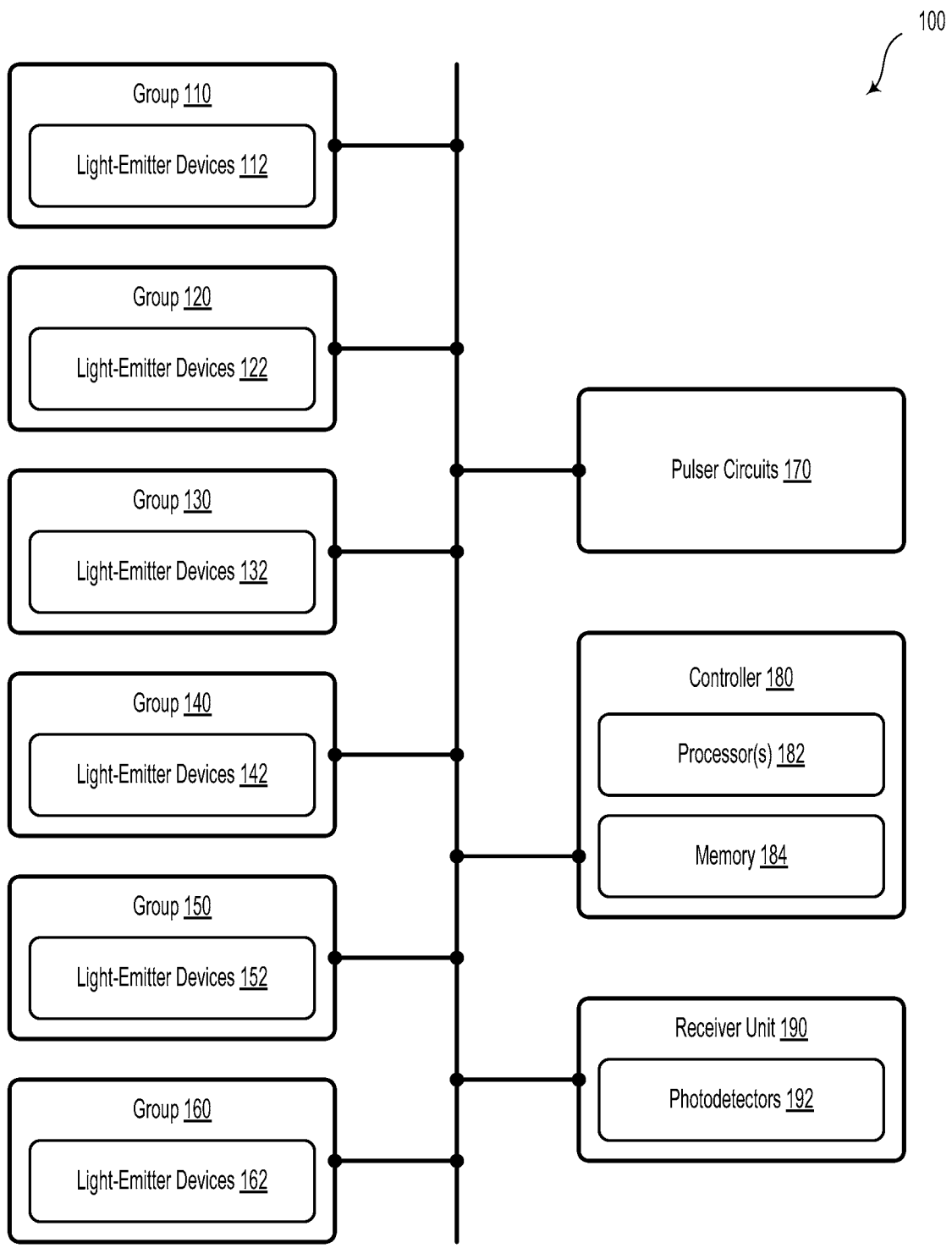
FIG. 1 illustrates a system, according to an example embodiment.

FIG. 1 illustrates a system 100, according to an example embodiment. In some embodiments, system 100 could be a LIDAR system. Alternatively, system 100 could represent a subsystem of such a LIDAR system. The LIDAR system could be configured to provide information (e.g., point cloud data) about one or more objects (e.g., location, shape, etc.) in a given environment. In an example embodiment, the LIDAR system could provide point cloud information, object information, mapping information, or other information to a vehicle. The vehicle could be a semi- or fully-automated vehicle. For instance, the vehicle could be a self-driving car, an autonomous drone aircraft, an autonomous truck, or an autonomous robot. Other types of vehicles and LIDAR systems are contemplated herein.

System 100 includes a plurality of light-emitter devices partitioned into a plurality of groups. Furthermore, each light-emitter device is associated with a given group of the plurality of groups. For example, as illustrated in FIG. 1, system 100 includes several pluralities of light-emitter devices: light-emitter devices 112, 122, 132, 142, 152, and 162. Each plurality of light-emitter devices 112, 122, 132, 142, 152, and 162 is associated with a group 110, 120, 130, 140, 150, and 160, respectively. Accordingly, each light-emitter device of the plurality of light-emitter devices is associated with a single group (e.g., either group 110, 120, 130, 140, 150, or 160) of the plurality of groups.

In some embodiments, the plurality of light-emitter devices could be disposed on one or more substrates. For example, the plurality of light-emitter devices could be disposed in a planar array along a surface of a substrate. Alternatively, the plurality of light-emitter devices could be distributed among a plurality of substrates. In such a scenario, each light-emitter device could be disposed along a faceted edge surface of one of a plurality (e.g., six) of substrates. Each facet edge could correspond to a different elevation angle. As such, the mounting position of respective light-emitter devices along the faceted edge surface could define, for example, a pointing axis and/or elevation angle of the respective light-emitter device.

In some embodiments, each group of the plurality of groups could include a plurality of spatially-adjacent light-emitter devices. For example, the groupings of light-emitter devices could be based on spatial proximity of the light-emitter devices with respect to one another within an array of light-emitter devices. In other words, light-emitter devices in close proximity to one another (e.g., within a predetermined spatial region of a light-emitter device array) could be grouped together.

Additionally or alternatively, the groupings of light-emitter devices could be based on the elevation angle or the pointing axis of the respective light-emitter devices. That is, light-emitter devices having a similar pointing axis direction (e.g., similar elevation angles and/or similar yaw angle)

could be grouped together. For example, light-emitter devices having a negative (downward) elevation angle could be grouped together. In such scenarios, light-emitter devices with substantially horizontal elevation angles could also be grouped together. Furthermore, light-emitter devices with positive (upward) elevation angles could be grouped together.

In some embodiments, system 100 could include six groups disposed in a 3×2 array (e.g., three rows and two columns). However, different arrangements of groups are contemplated. Furthermore, more or fewer groups are possible.

In some embodiments, the light-emitter devices 112, 122, 132, 142, 152, and 162 could include InGaAs/GaAs laser diodes configured to emit light at a wavelength around 903 nanometers. In some embodiments, the light-emitter devices 112, 122, 132, 142, 152, and 162 could include at least one of: a laser diode, a laser bar, or a laser stack. However, other types of light-emitting devices, materials, and emission wavelengths are possible and contemplated.

System 100 also includes a plurality of pulser circuits 170. Each light-emitter device of the plurality of light-emitter devices (e.g., light-emitter devices 112, 122, 132, 142, 152, and 162) is coupled to a corresponding pulser circuit of the plurality of pulser circuits 170. The pulser circuits 170 could be configured to provide current pulses so as to cause a coupled light-emitter device to emit light pulses. In an example embodiment, each of the pulser circuits 170 could include one or more field effect transistors (FETs). For instance, each of the pulser circuits 170 could include a plurality of GaN FETs operable to control one or more characteristics of light emitted from the corresponding light-emitter device. For example, the controllable characteristics could include a pulse duration, pulse power, etc. While some embodiments include a single pulser circuit being coupled to a single light-emitter device (e.g., a unique pulser circuit for each light-emitter device), other embodiments could include a single pulser circuit coupled to more than one light-emitter device (e.g., a unique pulser circuit for two or more light-emitter devices).

System 100 also includes a controller 180. The controller 180 may include an on-board vehicle computer, an external computer, or a mobile computing platform, such as a smartphone, tablet device, personal computer, wearable device, etc. Additionally or alternatively, the controller 180 may include, or be connected to, a remotely-located computer system, such as a cloud server network. In an example embodiment, the controller 180 may be configured to carry out some or all method blocks or steps described herein.

The controller 180 may include one or more processors 182 and at least one memory 184. The processor 182 may include, for instance, an application-specific integrated circuit (ASIC) or a field-programmable gate array (FPGA). Other types of processors, computers, or devices configured to carry out software instructions are contemplated herein. The memory 184 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors 182 of controller 180 may be configured to execute instructions stored in the memory 184 so as to carry out various operations described herein.

Additionally or alternatively, the controller 180 could include a circuit (e.g., a synchronous digital circuit) operable to carry out the various operations described herein. For example, the circuit may include a shot table. Other functions of the circuit (e.g., reading and sequencing) may be performed by a synchronous digital logic circuit. In some embodiments, the circuit and its operation may be specified in Verilog or another hardware description language. In such scenarios, the controller 180 need not include a processor.

The operations carried out by controller 180 include selecting a group (e.g., group 110, 120, 130, 140, 150, or 160) from the plurality of groups according to a predetermined group order. For example, in an embodiment, the predetermined group order could include (from first to last) group 110, group 120, group 130, group 140, group 150, and group 160. However, other predetermined group orders are possible and contemplated. In some embodiments, the predetermined group order could be configured so as to temporally separate light pulses emitted by spatially adjacent light-emitter devices.

The operations of controller 180 also include selecting a light-emitter device from the plurality of light-emitter devices of the selected group according to a firing order. In some embodiments, the firing order could include at least one out-of-order permutation. In such a scenario, the at least one out-of-order permutation includes a next-to-be-fired light-emitter device that is not adjacent to a last-fired light-emitter device as set forth in a nominal firing order. In some embodiments, the nominal firing order is configured such that spatially-adjacent light-emitter devices within a given group are temporally-adjacent to one another in firing order. In examples, the nominal firing order may include a predetermined firing pattern based on nearest neighbor proximity. That is, the next light-emitter device to be fired from a given group could be spatially adjacent to the prior light-emitter device fired from that group. For instance, light-emitter devices within a given group could be fired in a "serpentine" pattern among an array of light-emitter devices until all light-emitter devices in that group have been fired. Such nominal firing orders are easier to design and implement, and can be less expensive, than other designs. However, this nominal firing order does not take into account the dynamic nature of the environment, especially that of a moving vehicle.

The operations of controller 180 additionally include, at a predetermined shot dither time, causing, via its corresponding pulser circuit, the selected light-emitter device to emit at least one light pulse. The predetermined shot dither time is based on a shot dither schedule. In some embodiments, the shot dither schedule could include a plurality of pseudorandom shot dither times. For instance, the shot dither times could be pseudorandomly selected from a set of shot dither times between zero and 50 nanoseconds. Other ranges of shot dither times are possible and contemplated. Additionally or alternatively, the shot dither schedule could include predetermined values, such as in a fixed lookup table.

In some embodiments, the shot dither schedule could repeat after an integer number of complete scans. For example, the shot dither schedule could repeat after 1, 10, 100, 1000, or another integer number of complete scans.

The operations of controller 180 further include repeating the operations to provide a complete scan in which each light-emitter device of the plurality of light-emitter devices has emitted at least one pulse of light. In some embodiments, the firing order could repeat after an integer number of complete scans. For example, the firing order could repeat after 1, 10, 100, 1000, or another integer number of complete scans.

In some embodiments, system 100 also includes a receiver unit 190. In such scenarios, the operations of controller 180 could also include, after causing, via its corresponding pulser circuit, the selected light-emitter device to emit at least one pulse of light, enabling the receiver unit 190 to detect reflected light during a listening period. In such instances, the predetermined shot dither time could include a waiting time between zero and 50 nanoseconds after a prior listening period.

The receiver unit 190 includes one or more photodetectors 192 configured to provide information about the reflected light. The photodetectors 192 could include silicon photo-multipliers (SiPMs), avalanche photodiodes (APD), or another type of photo sensors, which could be arranged in a linear or areal array.

Figure 2A:
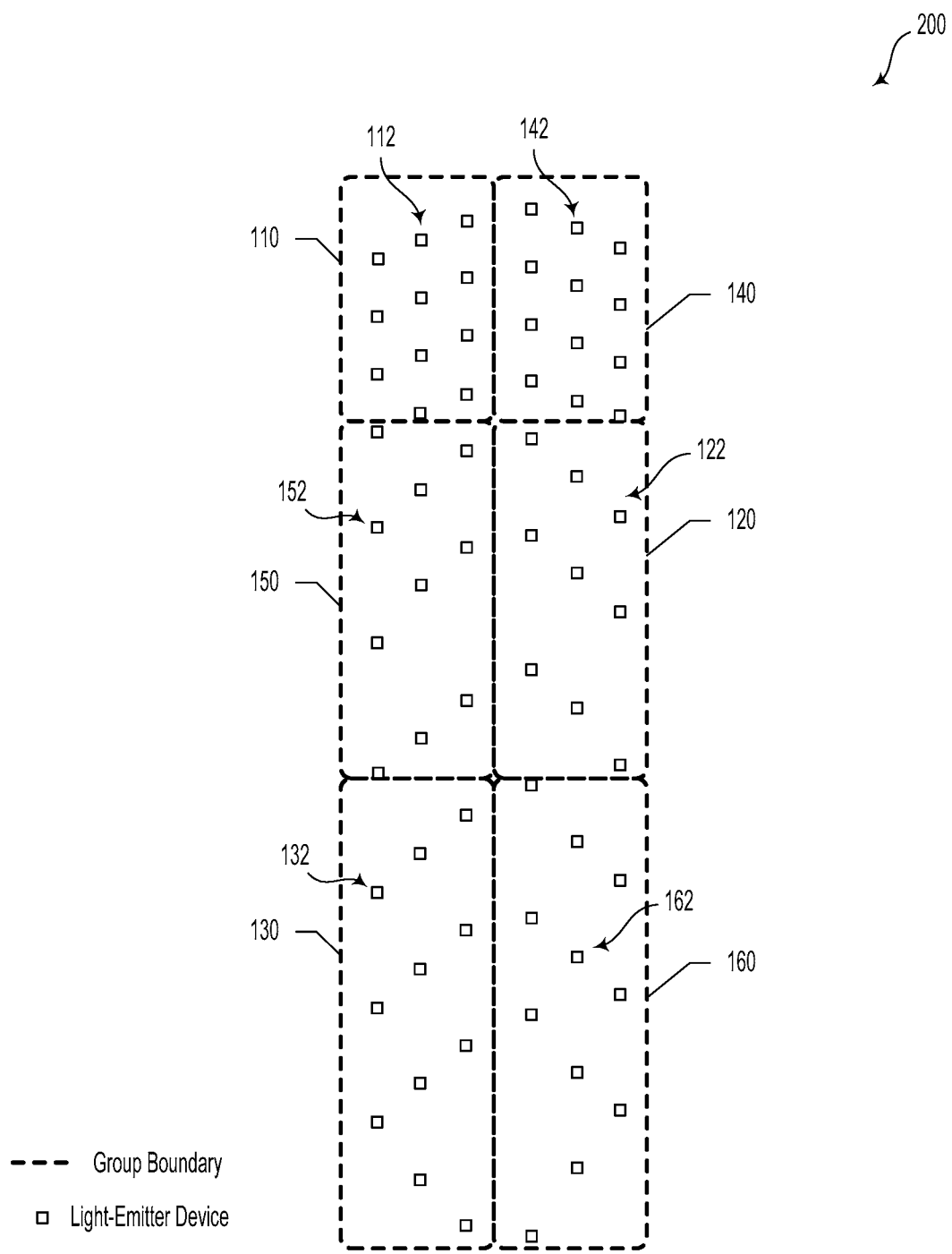
FIG. 2A illustrates a plurality of light-emitter devices and corresponding groups, according to an example embodiment.

FIG. 2A illustrates a schematic diagram 200 that includes a plurality of light-emitter devices (e.g., light-emitter devices 112, 122, 132, 142, 152, and 162) and corresponding groups (e.g., group 110, 120, 130, 140, 150, and 160), according to an example embodiment. The plurality of light-emitter devices could be provided in an two-dimensional array (e.g., along a flat or curved surface of a common substrate). Alternatively, the plurality of light-emitter devices could be provided along respective faceted edges of a plurality of substrates arranged in parallel. Other ways to provide the plurality of light-emitter devices are possible and contemplated herein.

As illustrated in FIG. 2A, Group 110 could include a plurality of light-emitter devices 112. Specifically, the plurality of light-emitter devices 112 could include 11 light-emitter devices, but more or less light-emitter devices are possible in group 110. Group 120 could include a plurality of light-emitter devices 122. Specifically, the plurality of light-emitter devices 122 could include 9 light-emitter devices, but more or less light-emitter devices are possible in group 120. Group 130 could include a plurality of light-emitter devices 132. Specifically, the plurality of light-emitter devices 132 could include 11 light-emitter devices, but more or less light-emitter devices are possible in group 130. Group 140 could include a plurality of light-emitter devices 142. Specifically, the plurality of light-emitter devices 142 could include 12 light-emitter devices, but more or less light-emitter devices are possible in group 140. Group 150 could include a plurality of light-emitter devices 152. Specifically, the plurality of light-emitter devices 152 could include 10 light-emitter devices, but more or less light-emitter devices are possible in group 150. Group 160 could include a plurality of light-emitter devices 162. Specifically, the plurality of light-emitter devices 162 could include 11 light-emitter devices, but more or less light-emitter devices are possible in group 160.

Taken together, the plurality of light-emitter devices 112, 122, 132, 142, 152, and 162 could include 64 total light-emitter devices. However, more or fewer light-emitter devices are possible and contemplated. Furthermore, while FIG. 2A illustrates a certain arrangement or pattern of the plurality of light-emitter devices, other arrangements or patterns are possible and contemplated.

Figure 2B:
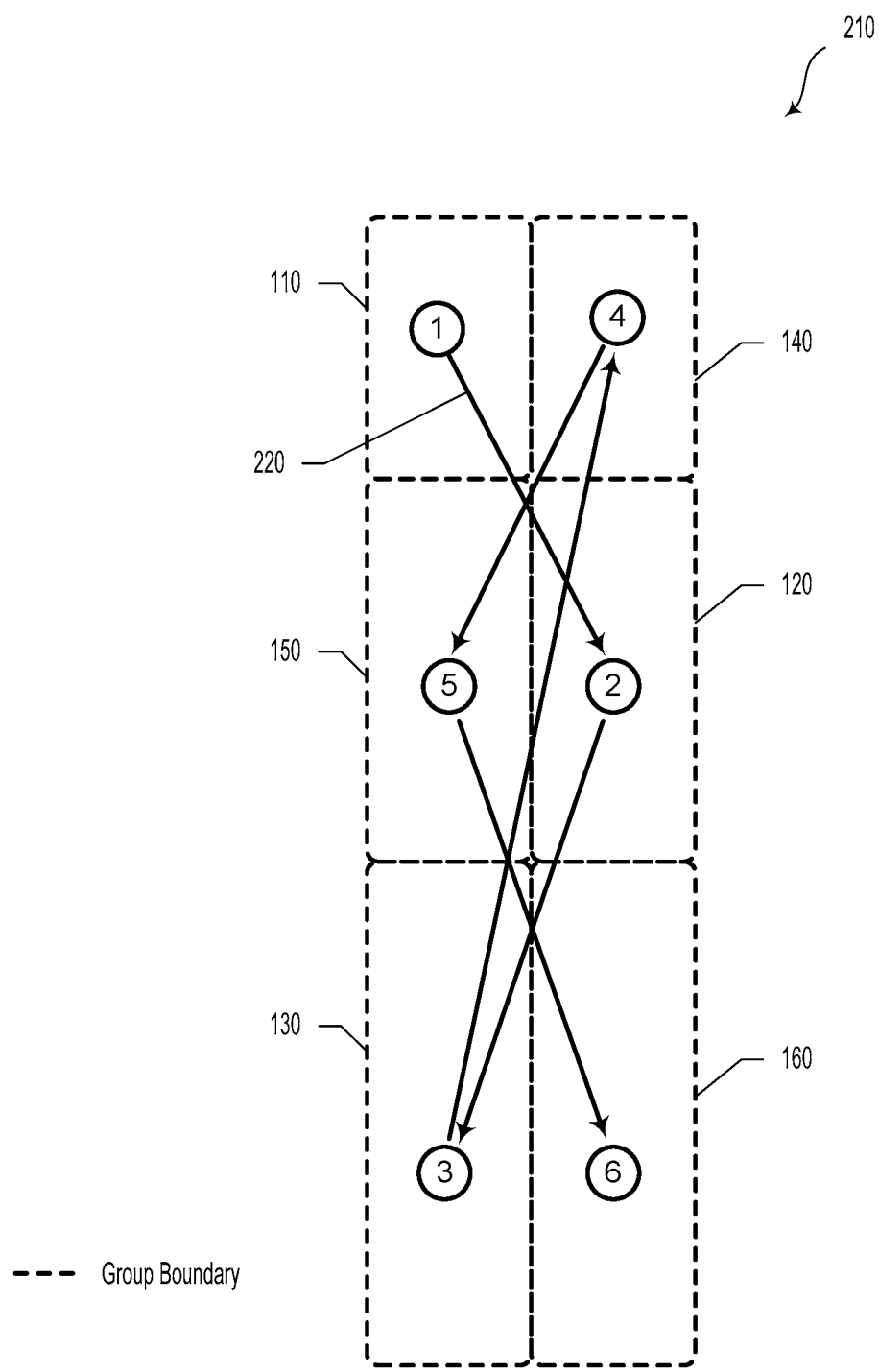
FIG. 2B illustrates a predetermined group order, according to an example embodiment.

FIG. 2B is a schematic diagram 210 that illustrates a predetermined group order 220, according to an example embodiment. In some embodiments, the predetermined group order 220 includes an ordering of the plurality of groups. Specifically, light-emitter device firing slots are provided one at a time and the predetermined group order 220 indicates which group is provided a firing slot at a given time. As illustrated in FIG. 2B, the predetermined group order is as follows: group 110 (indicated with a 1), group 120 (indicated with a 2), group 130 (indicated with a 3), group 140 (indicated with a 4), group 150 (indicated with a 5), and group 160 (indicated with a 6). As can be seen in FIG. 2B, after a shot from group 110, a shot is fired from a different horizontal group, e.g., group 120, and the next two shots are from different vertical groups, e.g., group 130 then group 140. Accordingly, the group shot order may be fixed and deterministic in this way, although other ways are also contemplated and described herein.

In some embodiments, the predetermined group order 220 is configured such that temporally-adjacent shots are fired from light-emitter devices in spatially non-adjacent groups. Furthermore, the predetermined group order 220 could be configured to minimize or eliminate temporally-adjacent shots fired from groups that are near neighbors. Other predetermined group orders are possible and contemplated.

Figure 3A:
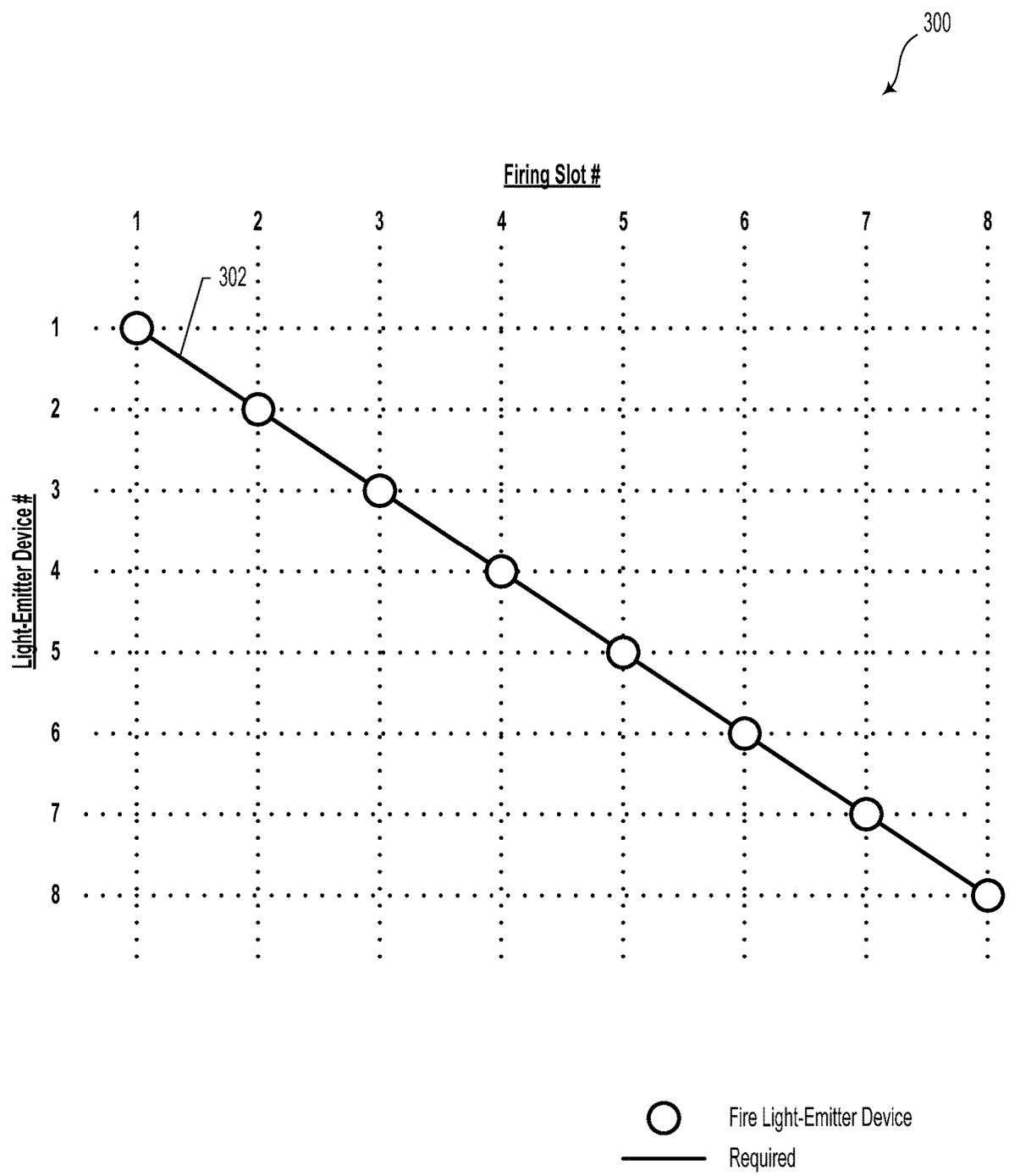
FIG. 3A illustrates a nominal shot schedule, according to an example embodiment.
Figure 3B:
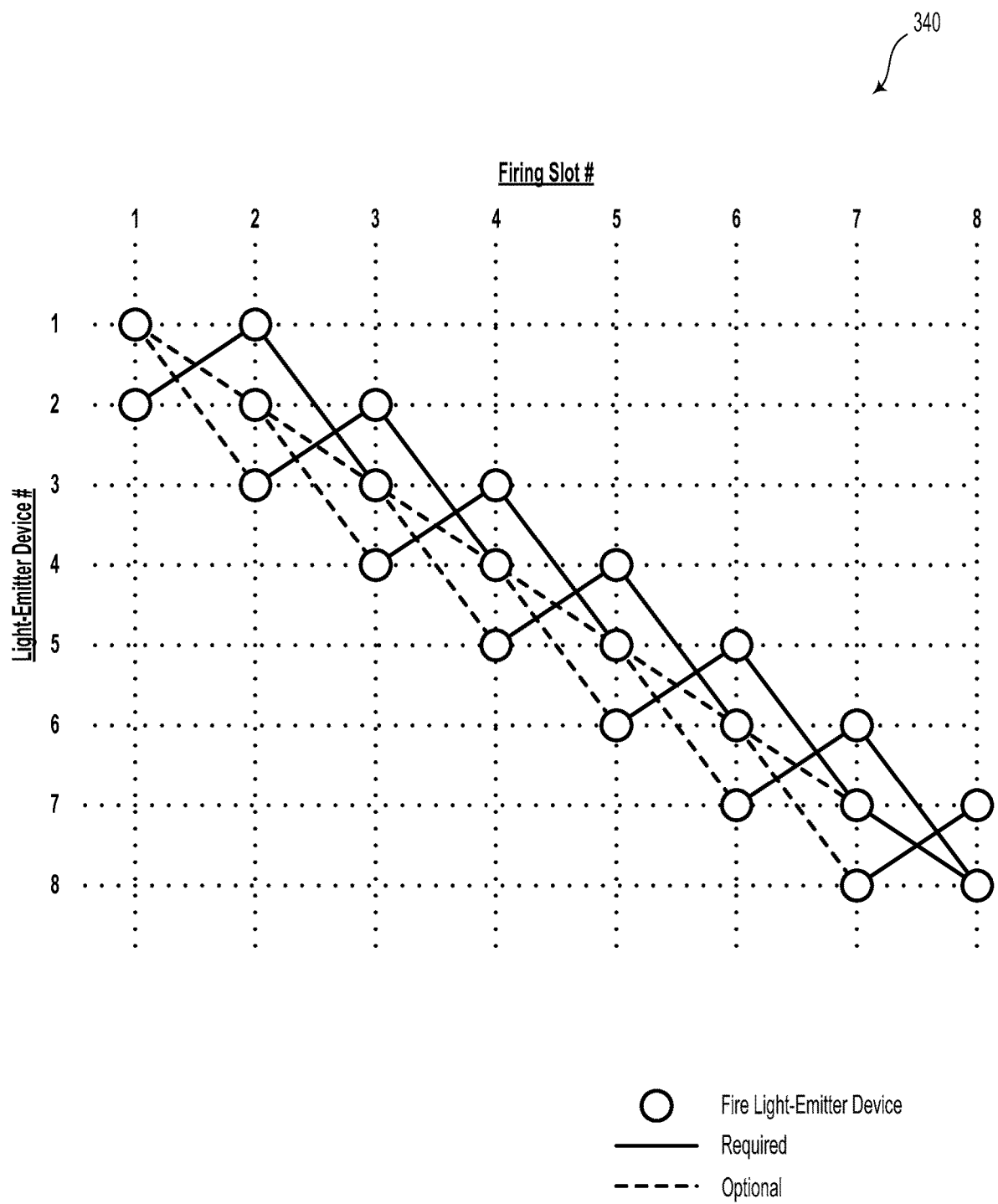
FIG. 3B illustrates a shot reordering schedule, according to an example embodiment.
Figure 3C:
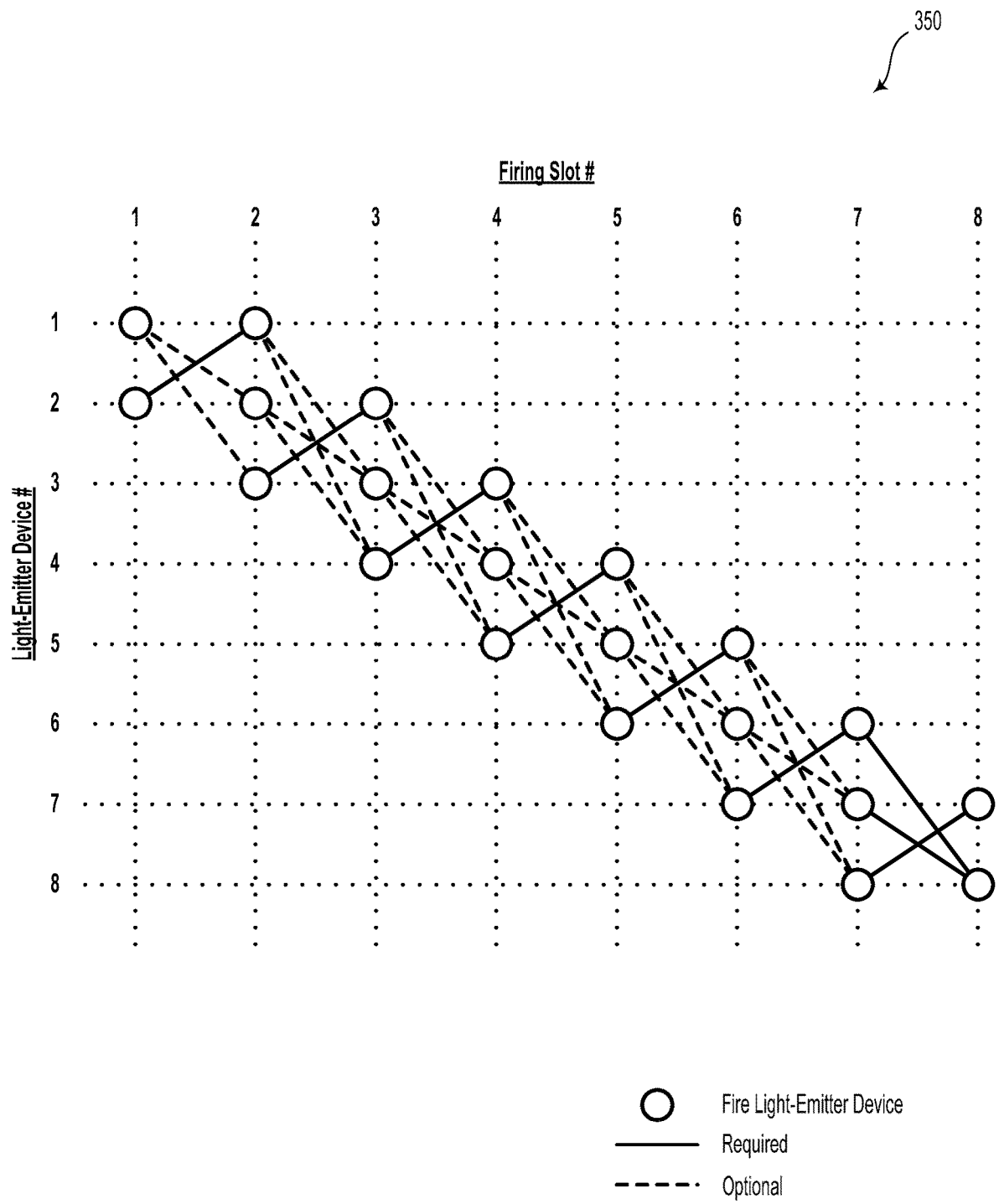
FIG. 3C illustrates a shot reordering schedule, according to an example embodiment.

FIGS. 3A, 3B, and 3C illustrate various shot schedules 300, 340, and 350 that could be carried out within the context of the present disclosure. For clarity and consistency, shot schedules 300, 340, and 350 provide information about an order of firing for 8 light-emitter devices. However, shot schedules for more or fewer light-emitter devices are possible and contemplated herein.

FIG. 3A illustrates a nominal shot schedule 300, according to an example embodiment. The nominal shot schedule 300 could include a nominal firing order 302 in which eight light-emitter devices are fired in order, according to their identifier numbers. That is, nominal firing order 302 initially fires light-emitter device #1 during firing slot #1. Subsequently, light-emitter device #2 is fired during firing slot #2, light-emitter device #3 is fired during firing slot #3, and so on until light-emitter device #8 is fired during firing slot #8.

FIGS. 3B and 3C illustrate shot reordering schedules that provide the possibility for alternative firing orders that differ from the nominal firing order 302. Namely, in some cases, shot reordering schedules 340 and 350 provide "options" for which light-emitter device can be fired during a given firing slot. In some embodiments, the determination between multiple firing options could be made by controller 180, as illustrated and described in reference to FIG. 1. For example, in some embodiments, the controller 180 may select a possible firing order based on, but not limited to, objects in an external environment, a prior point cloud map, an anticipated distance to target, etc. Specifically, the controller 180 could select a possible firing order that maximizes a shot repetition rate within the constraints of the given shot reordering schedule. Additionally or alternatively, selecting a given firing option could be based on a pseudo-random number generator, a user selection, or a user preference, among other possibilities.

The shot-reordering schedules described herein could be applied to shots within a given group and successive shots between groups could be deterministically interleaved (e.g., according to the predetermined group order 220). That is, in some embodiments, shot reordering is applied within each group and the individual shots from each group are fired in a "round-robin" fashion between different groups.

Put in another way, each group can fire one shot that is permuted according to a shot reordering schedule and the groups fire in a predetermined group order. With six groups, for example, after a given shot is fired according to a particular group's shot reordering schedule, five other shots are fired—one from each of the other groups—before a subsequent shot is fired according to the particular group's shot reordering schedule. In such a scenario, the reordering by +/−1 firing slot within the group could mean that any particular shot could be moved +/−6 overall firing slots with respect to an overall nominal shot sequence.

FIG. 3B illustrates a shot reordering schedule 340, according to an example embodiment. In this example, the light-emitter device that is fired in firing slot #1 could be either light-emitter device #1 (consistent with the nominal shot schedule) or light-emitter device #2 (as a variation from the nominal shot schedule). Shot reordering schedule 340 also allows for subsequent variations. For example, if light-emitter device #1 is fired in firing slot #1, then the shot reordering schedule 340 provides for two different options for firing slot #2: either light-emitter device #2 or light-emitter device #3 could be fired in firing slot #2. The options for firing a light-emitter device in firing slot N after firing a particular light-emitter device in firing slot N−1 are indicated in FIG. 3B by dashed lines. FIG. 3B also shows that portions of the reordering schedule 340 can be constrained, for example, to ensure that all of the light-emitter devices are eventually fired during a scan. In particular, if light-emitter device #2 is fired in firing slot #1, then light-emitter device #1 is required to be fired in firing slot #2 and light-emitter device #3 is required to be fired in firing slot #3. The constrained portions of the reordering schedule 340 are indicated in FIG. 3B by solid lines.

Shot reordering schedule 340 can be generalized to allow a permutation if light-emitter device N is fired during firing slot N (e.g., when a light-emitter device is fired in its nominal firing order). Specifically, if light-emitter device N is fired during firing slot N, then during firing slot N+1, either light-emitter device N+1 or light-emitter device N+2 could be fired. For eight light-emitter devices illustrated in shot reordering schedule 340, N would be constrained from 1-6 in this scenario.

Upon firing either light-emitter device #7 or #8 during firing slot #8 (the last firing slot for a group having 8 light-emitter devices), each of light-emitter devices of the group will have been fired according to the shot reordering schedule 340. For subsequent firing cycles, the shot reordering schedule 340 could be reused to provide an identical or different progression of light pulses from each light-emitter device of the group. Alternatively, a different shot reordering schedule or a nominal shot schedule could be utilized.

FIG. 3C illustrates a shot reordering schedule 350, according to an example embodiment. Namely, shot reordering schedule 350 could permit permutations in firing order if a light-emitter device is fired according to its nominal shot schedule or temporally "behind" its nominal firing schedule.

In this example, the light-emitter device that is fired in firing slot #1 could be either light-emitter device #1 (consistent with the nominal shot schedule) or light-emitter device #2 (as a variation from the nominal shot schedule). Shot reordering schedule 350 also allows for subsequent variations. For example, if light-emitter device #1 is fired in firing slot #1, then the schedule 350 provides for two different options for firing slot #2: either light-emitter device #2 or light-emitter device #3 could be fired in firing slot #2. Alternatively, if light-emitter device #2 is fired during firing slot #1, light-emitter device #1 must be fired during firing slot #2. In such a case, during firing slot #3, shot reordering schedule 350 then permits either light-emitter #3 or light-emitter #4 to be fired.

In other words, for values of N from 2 through 6 in this scenario, if light emitter N−1 is fired during firing slot N, shot reordering schedule 350 allows the option of either firing light emitter N+1 or light-emitter device N+2 during firing slot N+1.

Furthermore, similar to shot reordering schedule 340 as illustrated and described in reference to FIG. 3B, shot reordering schedule 350 allows a permutation where if light-emitter device N is fired during firing slot N, then either light-emitter device N+1 or light-emitter device N+2 could be fired during firing slot N+1 for N=1 to 6.

The options for firing a light-emitter device in firing slot N after firing a particular light-emitter device in firing slot N−1 are indicated in FIG. 3C by dashed lines. FIG. 3C also shows that portions of the reordering schedule 350 can be constrained, for example, to ensure that all of the light-emitter devices are eventually fired during a scan. In particular, if light-emitter device #2 is fired in firing slot #1, then light-emitter device #1 is required to be fired in firing slot #2. The constrained portions of the reordering schedule 340 are indicated in FIG. 3B by solid lines.

Upon firing either light-emitter device #7 or #8 during firing slot #8 (the last firing slot for a group having 8 light-emitter devices), each of light-emitter devices of the group will have been fired according to the shot reordering schedule 350. For subsequent cycles, the shot reordering schedule 350 could be used to provide an identical or different progression of light pulses from each light-emitter device of the group. Alternatively, a different shot reordering schedule or a nominal shot schedule could be utilized.

While FIGS. 3B and 3C illustrate particular shot reordering schedules, it will be understood that other schedules are possible. For example, schedules with drop-outs (skipped light-emitter devices), schedules with repeats (temporally-adjacent light pulses from the same light-emitter device), or schedules with more or fewer permutations (optional firing order) are possible. Furthermore, it will be understood that while firing slots will normally proceed incrementally in time (e.g., firing slot 1, then firing slot 2, etc.), light-emitter device numbers are merely designations for light-emitter devices in a given group that need not correlate to a spatial location of a given light-emitter device within that group. In other words, light-emitter device #2 could be near or nearest (spatial) neighbors with light-emitter device #1 and light-emitter device #3 within their shared group, but such a spatial relationship is not necessarily required for all embodiments contemplated herein.

Figure 3D:
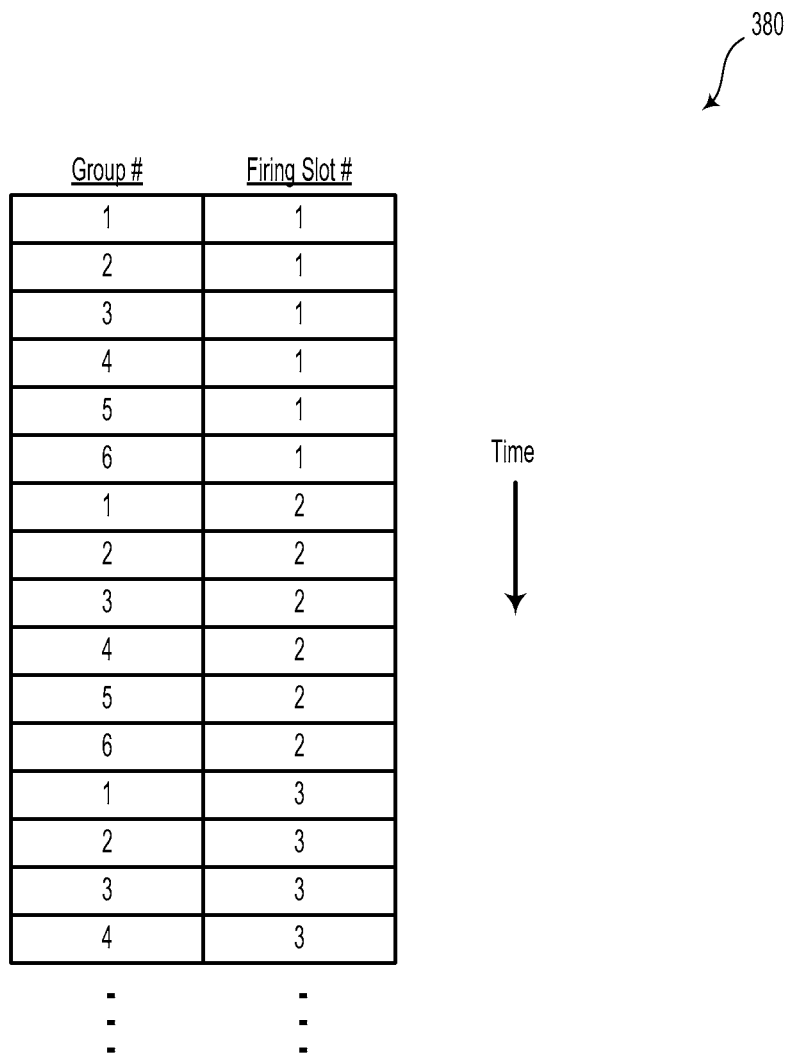
FIG. 3D illustrates a global firing schedule, according to an example embodiment.

FIG. 3D illustrates a global firing schedule 380, according to an example embodiment. Global firing schedule 380 illustrates how firing slots could be utilized between six groups of light-emitter devices. For example, each of groups 1-6 (e.g., groups 110, 120, 130, 140, 150, and 160 as illustrated and described in reference to FIG. 1) could successively fire respective light-emitter devices as permitted by their respective shot schedules during respective firing slot #1. Thereafter, each of the groups 1-6 may successively fire respective light-emitter devices as permitted by their respective shot schedules during respective firing slot #2, and so on. While global firing schedule 380 illustrates a specific progression of groups and firing slots, other progressions are possible and contemplated herein. Specifically, if the groups do not have the same number of light-emitter devices, firing cycles without repeat firing could provide that successive firing slot # between groups (e.g., group #1, firing slot #1 could be followed in time by group #2, firing slot #6, etc.)

In some embodiments, each group of light-emitter devices could have different shot reordering schedules. For example, group 110 could operate according to a first shot reordering schedule, group 120 could operate according to a second shot reordering schedule that is different from the first shot reordering schedule, and so on.

FIG. 4A illustrates a shot dither schedule 400, according to an example embodiment. As described herein, a shot dither time could be included in the firing cycle so as to reduce the possibility for cross-talk interference and/or prevent malicious attacks (e.g., spoofing). Namely, by introducing a pseudorandom shot dither delay, LIDAR systems can operate more securely and robustly. In some embodiments, the shot dither time could represent a delay from an end of a listening window (e.g., the time during which a receiver listens for reflected light from a prior light pulse) before the next light pulse is emitted.

As illustrated in FIG. 4A, a different shot dither time could be assigned to each group and each firing slot within a respective shot reordering schedule. For example, group #1, firing slot #1 could be associated with a shot dither time of 23 nanoseconds. Group #1, firing slot #2 could be associated with a shot dither time of 41 nanoseconds, and so on. In other embodiments, an identical shot dither time could be assigned to each firing slot of a given cycle (and change for subsequent cycles). In some embodiments, the shot dither time could vary between zero and 50 nanoseconds. However, other shot dither times are possible and contemplated.

Figure 4B:
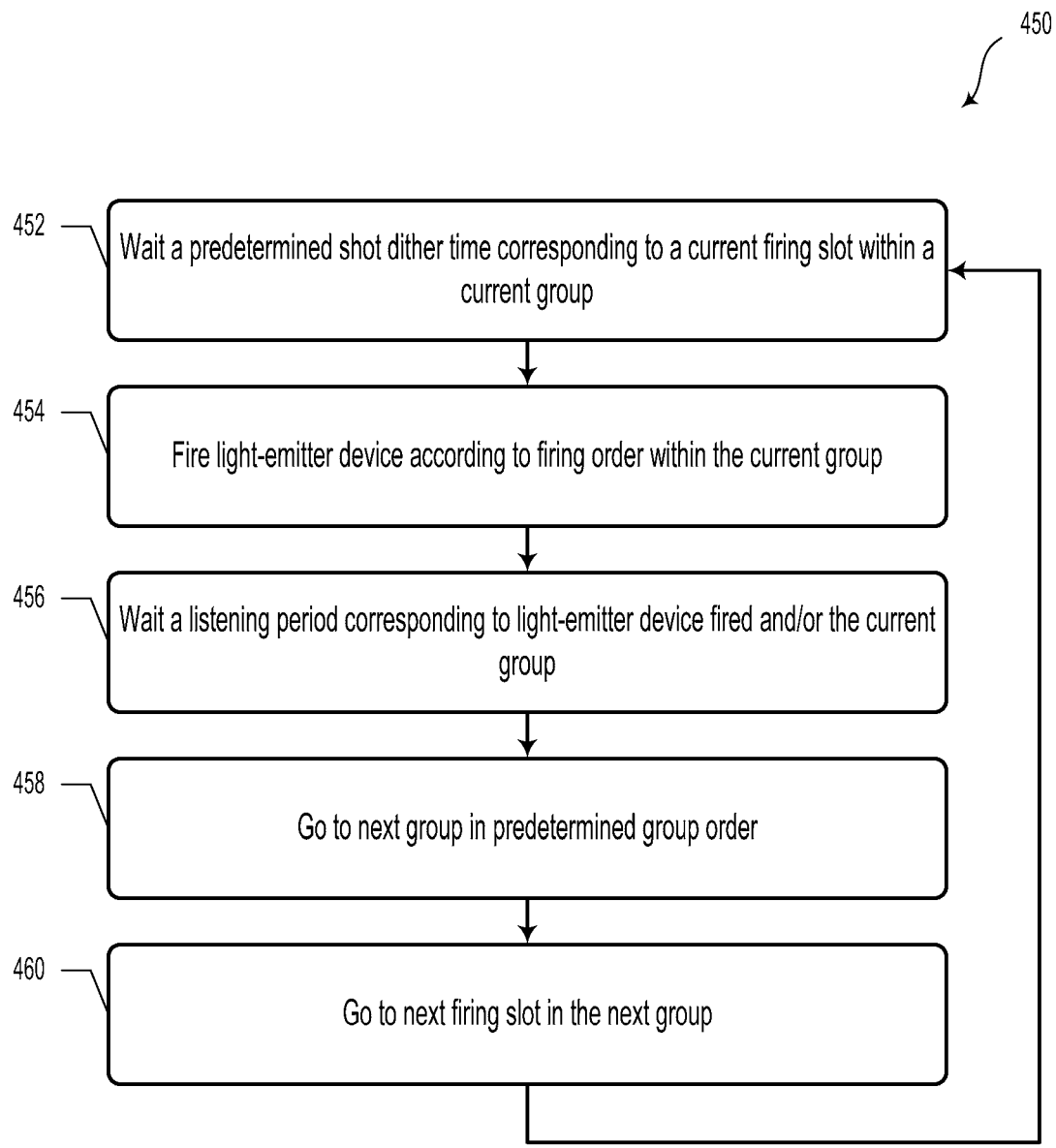
FIG. 4B illustrates a shot timing cycle, according to an example embodiment.

FIG. 4B illustrates a shot timing cycle 450, according to an example embodiment. Shot timing cycle 450 illustrates the general progression of a system-wide firing schedule. However, blocks could be repeated, skipped, taken out of order, etc.

Block 452 includes waiting for a predetermined shot dither time corresponding to a current firing slot within a current group. In reference to shot dither schedule 400 of FIG. 4A, if the current group is #1 and the current firing slot is #1, block 452 could include waiting for 23 nanoseconds after a prior listening window.

Block 454 includes firing a light-emitter device according to a firing order within the current group. In other words, a light-emitter device of the current group (e.g., group 1) could be fired during a current firing slot (e.g., firing slot #1) according to, for example, shot reordering schedule 340 or 350.

Block 456 includes waiting for a listening period that corresponds to the fired light-emitter device and/or the corresponding group of the fired light-emitter device. For example, if the fired light-emitter device emitted a light pulse toward a ground surface, the listening period could be relatively short (e.g., 100-250 nanoseconds). In such a scenario, if a light pulse was emitted at a higher elevation angle (e.g., above the horizon), the listening period could be relatively longer (e.g., 650 nanoseconds up to 2 microseconds or more). Other listening periods are possible.

Block 458 includes going to the next group in the predetermined group order. For example, if a light-emitter device from group 1 had just been fired, the next group in the predetermined group order would be group 2.

Block 460 includes going to the next firing slot in the next group. In other words, a current firing slot may be incremented (or reset to firing slot #1) for the shot reordering schedule for the next group.

Thereafter, the shot timing cycle 450 could be repeated continuously or upon user interaction and/or user command. Accordingly, a LIDAR system could cycle through each light-emitter device of a plurality of such devices so as to obtain information about an environment of the system.

Figure 5:
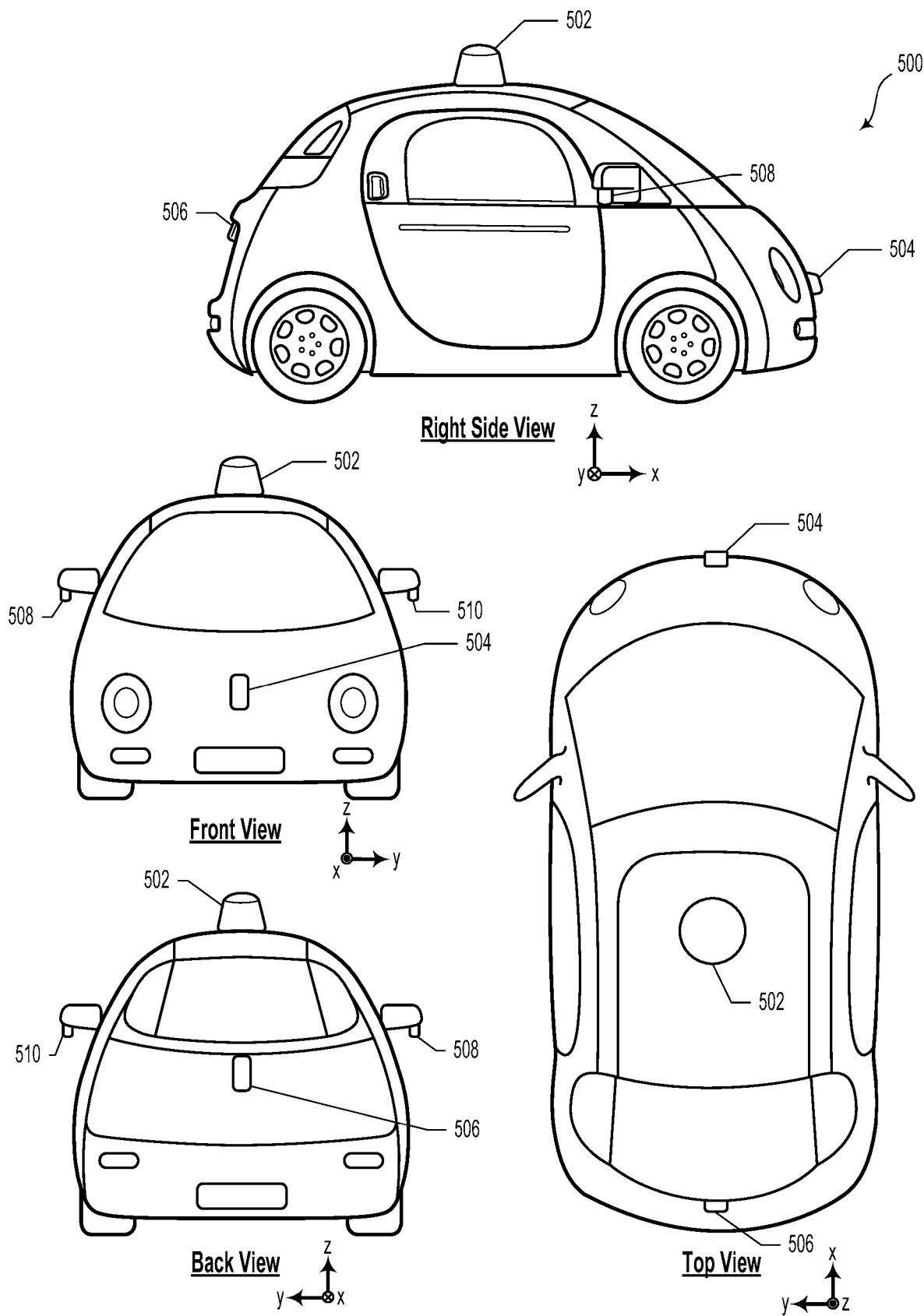
FIG. 5 illustrates a vehicle, according to an example embodiment.

FIG. 5 illustrates a vehicle, according to an example embodiment. The vehicle 500 may include one or more sensor systems 502, 504, 506, 508, and 510. The one or more sensor systems 502, 504, 506, 508, and 510 could be similar or identical to system 100, as illustrated and described below with reference to FIG. 1. As an example, sensor systems 502, 504, 506, 508, and 510 may include groups 110, 120, 130, 140, 150, and 160. Namely, sensor systems 502, 504, 506, 508, and 510 could include LIDAR sensors having a plurality of light-emitter devices arranged over a range of elevation angles with respect to a given plane (e.g., the x-y plane).

One or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, etc.), information about the environment may be determined.

In an example embodiment, sensor systems 502, 504, 506, 508, and 510 may be configured to provide respective point cloud information that may relate to physical objects within the environment of the vehicle 500. While system 100, vehicle 500 and sensor systems 502, 504, 506, 508, and 510 are illustrated as including certain features, it will be understood that other types of systems are contemplated within the scope of the present disclosure.

Figure 6:
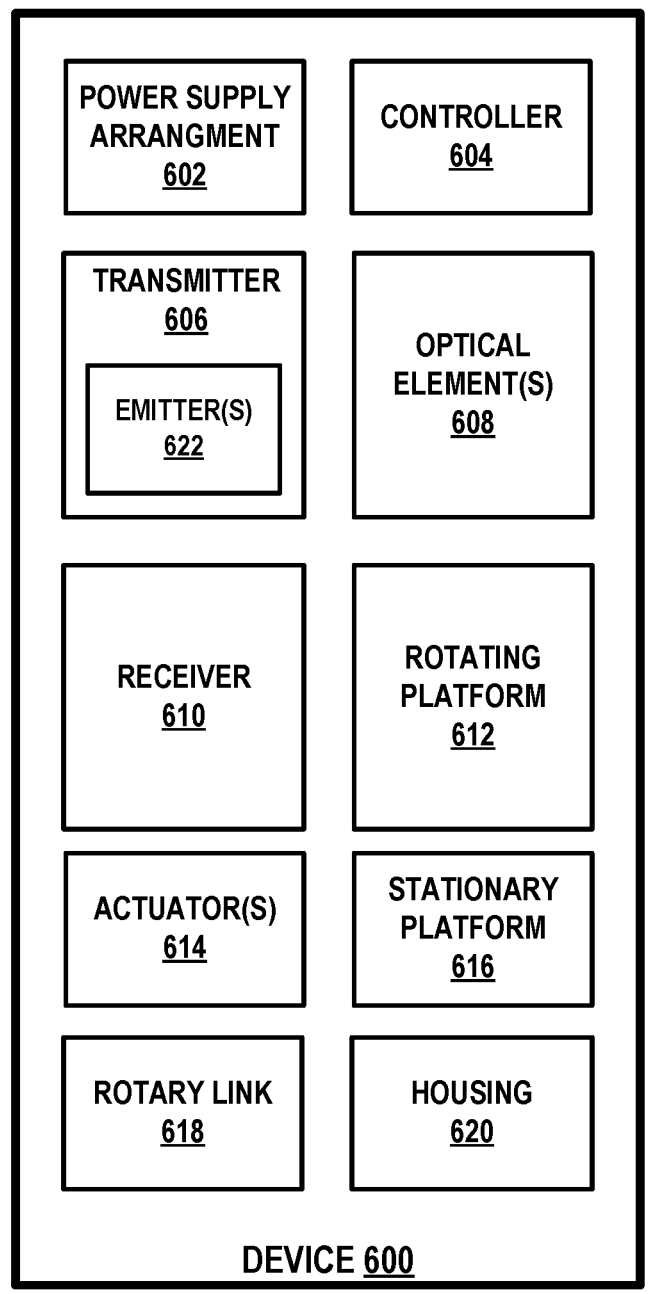
FIG. 6 illustrates a device, according to an example embodiment.

FIG. 6 is a simplified block diagram of a device 600, according to example embodiments. As shown, device 600 includes a power supply arrangement 602, a controller 604, a transmitter 606, one or more optical elements 608, a receiver 610, a rotating platform 612, one or more actuators 614, a stationary platform 616, a rotary link 618, and a housing 620. In some embodiments, device 600 may include more, fewer, or different components. Additionally, the components shown may be combined or divided in any number of ways.

Power supply arrangement 602 may be configured to supply, receive, and/or distribute power to various components of device 600. To that end, power supply arrangement 602 may include or otherwise take the form of a power source (e.g., battery cells, etc.) disposed within device 600 and connected to various components of the device 600 in any feasible manner, so as to supply power to those components. Additionally or alternatively, power supply arrangement 602 may include or otherwise take the form of a power adapter configured to receive power from one or more external power sources (e.g., from a power source arranged in a vehicle to which device 600 is mounted) and to transmit the received power to various components of device 600.

Controller 604 may be similar to controller 180 of system 100.

Transmitter 606 may be configured to transmit signals toward an environment of device 600. To that end, as shown, transmitter 606 includes one or more emitters 622. Emitters 622 may be similar to light-emitter devices 112, 122, 132, 142, 152, and 166 of system 100.

For example, device 600 may be configured as a LIDAR sensor that operates transmitter 606 to scan a field-of-view (FOV) of the LIDAR sensor. In this example, controller 604 can be configured to obtain a sequence of scans of the FOV. For each scan of the sequence of scans, controller 604 may control transmitter 606 to emit a plurality of impulses toward the FOV. Each impulse may include at least one light pulse, in line with the discussion above.

In one implementation, controller 604 may cause transmitter 606 to emit one or more impulses of the plurality of impulses toward a first section of the FOV, and one or more other impulses toward a second section of the FOV. Referring back to FIG. 2A for example, emitters 622 of transmitter 606 can be spatially arranged as the plurality of groups 110, 120, 130, 140, 150, 160 of ample, light-emitter devices. With this arrangement, the first section of the FOV may correspond to a first region of the environment of device 600 that receives light from light-emitter devices 112 of the first group 110, the second section of the FOV may correspond to a second region of the environment that receives light from light-emitter devices 122 of the second group 120, and so on.

Further, in this implementation, controller 604 may cause transmitter 606 to emit each impulse toward the second section of the FOV subsequent to emitting a respective impulse toward the first section of the FOV. For example, emitters 622 of transmitter 606 can be configured to emit respective impulses according to the predetermined group order and/or the firing order in the description of FIGS. 1, 2A-2B, 3A-3D, and 4A-4B.

Optical element(s) 608 can be arranged to direct light from emitters 622 of transmitter 606 toward the FOV of device 600, in line with the discussion above. Additionally, in some examples, optical element(s) 608 can be arranged to focus light from the FOV for receipt by receiver 610. As such, optical element(s) 608 may include any feasible combination of mirror(s), waveguide(s), lens(es), or other types optical components, that are arranged to guide propagation of light through physical space and/or to adjust certain characteristics of the light.

Receiver 610 may be similar to receiver unit 190. For example, receiver 610 could be arranged to receive light from the FOV illuminated by transmitter 606.

Rotating platform 612 may be configured to rotate about an axis. To that end, rotating platform 612 can be formed from any solid material suitable for supporting one or more components mounted thereon. For example, transmitter 606 and receiver 610 may be arranged on rotating platform 612 such that each of these components moves relative to the environment based on rotation of rotating platform 612. In particular, these components could be rotated about an axis so that device 600 may obtain information from various directions. In this manner, a pointing direction of device 600 can be adjusted horizontally by actuating the rotating platform 610 to adjust a FOV of device 600 in various directions.

In order to rotate platform 612 in this manner, one or more actuators 614 may actuate the rotating platform 610. To that end, actuators 614 may include motors, pneumatic actuators, hydraulic pistons, and/or piezoelectric actuators, among other possibilities.

With this arrangement, controller 604 could operate actuator 614 to rotate rotating platform 612 in various ways so as to obtain information about the environment. In one example, rotating platform 612 could be rotated in either direction. In another example, rotating platform 612 may carry out complete revolutions such that device 600 scans a 360° view of the environment. Moreover, rotating platform 612 could rotate at various frequencies so as to cause device 600 to scan the environment at various refresh rates. In one embodiment, device 600 may be configured to have a refresh rate of 10 Hz (e.g., ten complete rotations of device 600 per second). Other refresh rates are possible.

Alternatively or additionally, device 600 may be configured to adjust the pointing direction of an emitted signal (emitted by transmitter 606) in various ways. In one example, emitters 622 of transmitter 606 can be coupled to phased array optics that control the phase of light waves emitted by the light sources. For instance, controller 604 can be configured to adjust the phased array optics (e.g., phased array beam steering) to change the effective pointing direction of a light signal emitted by transmitter 606 (e.g., even if rotating platform 612 is not rotating).

In some examples, device 600 can select or adjust a horizontal scanning resolution by changing a rate of rotation of device 600 (and/or transmitter 606 and receiver 610). Additionally or alternatively, the horizontal scanning resolution can be modified by adjusting a pulse rate of signals emitted by transmitter 606. In a first example, transmitter 606 may be configured to emit pulses at a pulse rate of 15,650 pulses per second, and to rotate at 10 Hz (i.e., ten complete 360° rotations per second) while emitting the pulses. In this example, receiver 610 may have a 0.23° horizontal angular resolution (e.g., horizontal angular separation between consecutive pulses). In a second example, if device 600 is instead rotated at 20 Hz while maintaining the pulse rate of 15,650 pulses per second, then the horizontal angular resolution may become 0.46°. In a third example, if transmitter 606 emits the pulses at a rate of 31,300 pulses per second while maintaining the rate of rotation of 10 Hz, then the horizontal angular resolution may become 0.115°. In some examples, device 600 can be alternatively configured to scan a particular range of views within less than a complete 360° rotation of device 600. Other implementations are possible as well.

It is noted that the pulse rates, angular resolutions, rates of rotation, and viewing ranges described above are only for the sake of example, and thus each of these scanning characteristics could vary according to various applications of device 600.

Stationary platform 616 may take on any shape or form and may be configured for coupling to various structures, such as to a top of a vehicle (e.g., vehicle 500), a robotic platform, assembly line machine, or any other system that employs device 600 to scan its surrounding environment, for example. Also, the coupling of the stationary platform may be carried out via any feasible connector arrangement (e.g., bolts, screws, etc.).

Rotary link 618 directly or indirectly couples stationary platform 616 to rotating platform 612. To that end, rotary link 618 may take on any shape, form and material that provides for rotation of rotating platform 612 about an axis relative to the stationary platform 616. For instance, rotary link 618 may take the form of a shaft or the like that rotates based on actuation from actuator 614, thereby transferring mechanical forces from actuator 614 to rotating platform 612. In one implementation, rotary link 618 may have a central cavity in which one or more components of device 600 may be disposed. In some examples, rotary link 618 may also provide a communication link for transferring data and/or instructions between stationary platform 616 and rotating platform 612 (and/or components thereon such as transmitter 606 and receiver 610).

Housing 620 may take on any shape, form, and material and may be configured to house one or more components of device 600. In one example, housing 620 can be a dome-shaped housing. Further, in some examples, housing 620 may be composed of a material that is at least partially non-transparent, which may allow for blocking of at least some signals from entering the interior space of the housing 620 and thus help mitigate thermal and noise effects of ambient signals on one or more components of device 600. Other configurations of housing 620 are possible as well.

In some examples, housing 620 may be coupled to rotating platform 612 such that housing 620 is configured to rotate based on rotation of rotating platform 612. In these examples, transmitter 606, receiver 610, and possibly other components of device 600 may each be disposed within housing 620. In this manner, transmitter 606 and receiver 610 may rotate along with housing 620 while being disposed within housing 620. In other examples, housing 620 may be coupled to stationary platform 616 or other structure such that housing 620 does not rotate with the other components rotated by rotating platform 612.

It is noted that the arrangement of device 600 described above is for exemplary purposes only and is not meant to be limiting. As noted above, in some examples, device 600 can be alternatively implemented with fewer components than those shown. In one example, device 600 can be implemented without rotating platform 612. For instance, transmitter 606 can be configured to transmit a plurality of signals spatially arranged to define a particular FOV of device 600 (e.g., horizontally and vertically) without necessarily rotating transmitter 606 and receiver 610. Other examples are possible as well.

III. Example Methods

Figure 7:
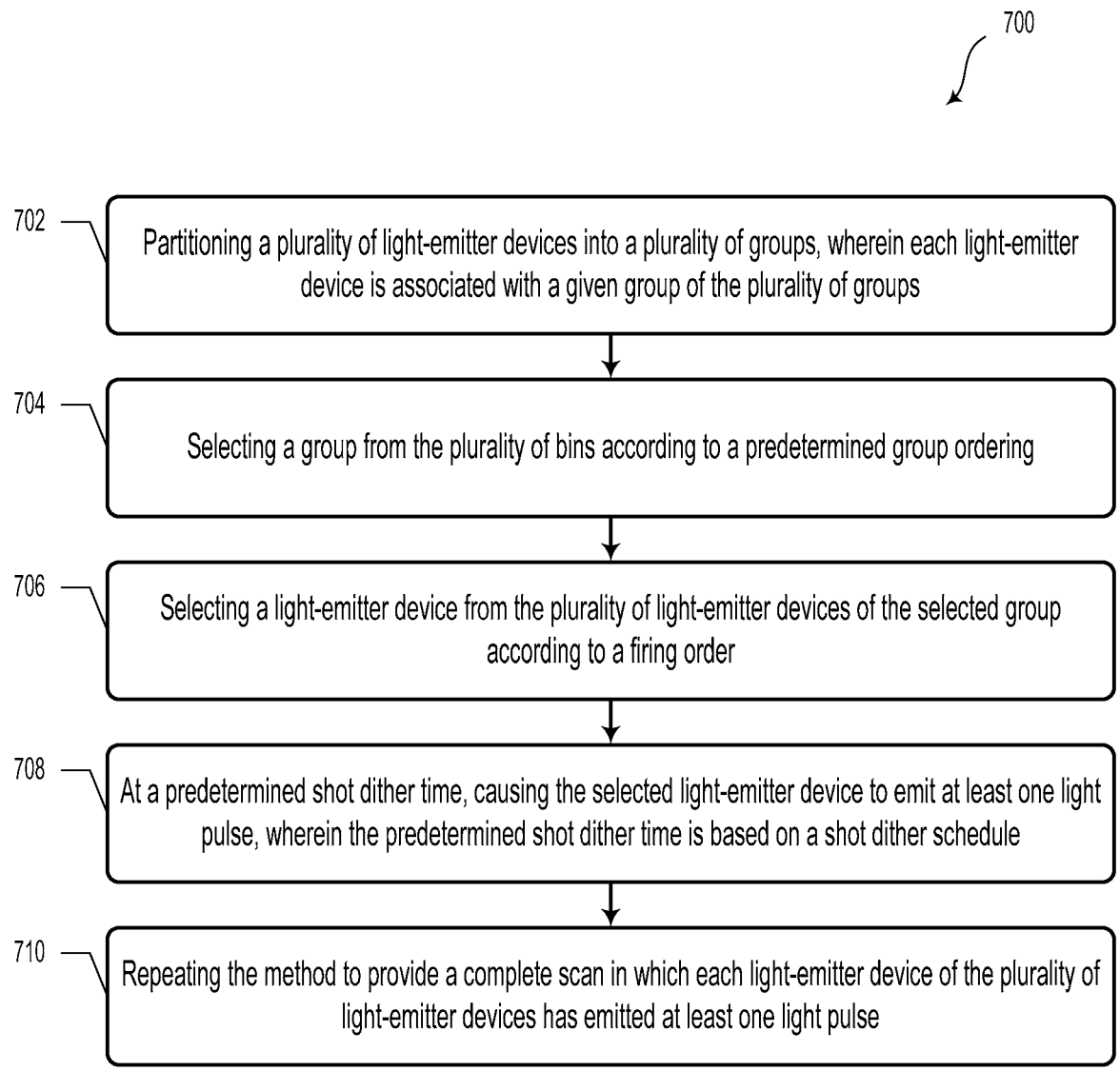
FIG. 7 illustrates a method, according to an example embodiment.

FIG. 7 illustrates a method 700, according to an example embodiment. It will be understood that the method 700 may include fewer or more steps or blocks than those expressly illustrated or otherwise disclosed herein. Furthermore, respective steps or blocks of method 700 may be performed in any order and each step or block may be performed one or more times. In some embodiments, some or all of the blocks or steps of method 700 may be carried out by controller 180 as illustrated and described in relation to FIG. 1.

Block 702 includes partitioning a plurality of light-emitter devices into a plurality of groups. Each light-emitter device is associated with a given group of the plurality of groups. For example, the plurality of groups could include group 110, 120, 130, 140, 150, and 160, as illustrated and described in relation to FIGS. 1, 2A, and 2B. In some embodiments, the plurality of groups includes a 3×2 array of groups. However, other arrangements of the plurality of groups are possible and contemplated.

Block 704 includes selecting a group from the plurality of groups according to a predetermined group order. As an example, the selected group could be based on the predetermined group order 210 as illustrated and described in reference to FIG. 2B.

Block 706 includes selecting a light-emitter device from the plurality of light-emitter devices of the selected group according to a firing order. In some embodiments, the firing order could include at least one out-of-order permutation. For example, the at least one out-of-order permutation includes a next-to-be-fired light-emitter device that is not adjacent to a last-fired light-emitter device as set forth in a nominal firing order. In such scenarios, the nominal firing order could be configured such that spatially-adjacent light-emitter devices within a given group are temporally-adjacent to one another in firing order.

In some embodiments, selecting the light-emitter device to be fired could be performed according to shot reordering schedules 340 and 350, as illustrated and described in reference to FIGS. 3B and 3C.

Block 708 includes, at a predetermined shot dither time, causing the selected light-emitter device to emit at least one light pulse, wherein the predetermined shot dither time is based on a shot dither schedule. In some embodiments, the predetermined group order could be configured so as to temporally separate light pulses emitted from spatially adjacent light-emitter devices. In some embodiments, the shot dither schedule could include a plurality of pseudorandom shot dither times.

Block 710 includes repeating at least some of the blocks of method 700 to provide a complete scan in which each light-emitter device of the plurality of light-emitter devices has emitted at least one light pulse. In example embodiments, a pulse length of the at least one light pulse could be within a range between 10 picoseconds to 10 nanoseconds. It will be understood that other pulse lengths are possible and contemplated.

In some embodiments, a pulse repetition rate of the light pulses could be between 50 kilohertz and 1 megahertz. Other pulse repetition rates are possible and contemplated.

In some embodiments, each light-emitter device of the plurality of light-emitter devices could be coupled to a corresponding pulser circuit of a plurality of pulser circuits. In such scenarios, causing the selected light-emitter device to emit at least one light pulse could include causing the corresponding pulser circuit to provide a current or voltage pulse to the selected light-emitter device.

Furthermore, method 700 could include, after causing the corresponding pulser circuit to provide a current or voltage pulse to the light-emitter device, enabling a receiver unit to detect reflected light during a listening period. In some embodiments, the predetermined shot dither time could include a waiting time between zero and 50 nanoseconds after a prior listening period.

In some embodiments, the firing order could repeat after an integer number of complete scans. For example, the firing order could repeat after 1, 10, 100, 1000, or another integer number of complete scans. In a similar fashion, the shot dither schedule could repeat after an integer number of complete scans.

In some implementations, method 700 involves directing light emitted by a first group of the plurality of groups of light-emitter devices toward a first section of a field-of-view (FOV), and directing light emitted by a second group of the plurality of groups toward a second section of the FOV. By way of example, optical elements 608 (shown in FIG. 6) can be arranged to direct light emitted by the first group 110 (shown in FIG. 2A) toward the first section of the FOV, and to direct light emitted by the second group 120 (shown in FIG. 2A) toward the section of the FOV. Thus, for instance, each section of the FOV of system 100 may correspond to a region of the environment of system 100 that receives light from a respective group of light-emitter devices.

In these implementations, method 700 may also involve causing, in a particular order, each of the plurality of light-emitter devices to emit light. Further, each of the light-emitter devices in the first group is subsequent to, in the particular order, a respective light-emitter device in the second group. For example, the particular order may be based on the predetermined group order and/or the firing order described at blocks 704-708.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium. The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various aspects and embodiments have been disclosed herein, other aspects and embodiments will be apparent to those skilled in the art. Embodiments of the present disclosure may thus relate to one of the enumerated example embodiments (EEEs) listed below.

EEE 1 is a system comprising:
  a plurality of light-emitter devices partitioned into a plurality of groups, wherein each light-emitter device is associated with a given group of the plurality of groups, wherein each group comprises light-emitter devices disposed within a respective contiguous region; and
  a controller, wherein the controller carries out operations, the operations comprising:
  causing each of the plurality of light-emitter devices to emit an impulse, wherein the impulse comprises at least one light pulse, wherein the plurality of the impulses is emitted from the plurality of light-emitter devices based on a firing order, wherein between temporally-adjacent impulses emitted from light-emitter devices in a given group, an impulse from a light-emitter device in at least one other group is timed to occur, and wherein between temporally-adjacent impulses emitted from a given light-emitter device, an impulse from every other light-emitter device in the same group is timed to occur.

EEE 2 is the system of EEE 1, wherein the plurality of impulses is emitted among the plurality of groups based on a predetermined group order, wherein the predetermined group order is configured so as to temporally separate light pulses emitted by spatially adjacent groups.

EEE 3 is the system of EEE 1, wherein each group of the plurality of groups comprises a plurality of spatially-adjacent light-emitter devices within the respective contiguous region.

EEE 4 is the system of EEE 3, wherein the firing order comprises at least one out-of-order permutation, wherein the at least one out-of-order permutation comprises a next-to-be-fired light-emitter device that is not adjacent to a last-fired light-emitter device as set forth in a nominal firing order.

EEE 5 is the system of EEE 4, wherein the nominal firing order is configured such that spatially-adjacent light-emitter devices within a given group are temporally-adjacent to one another in firing order.

EEE 6 is the system of EEE 4, wherein the firing order repeats after all of the light-emitter devices of the plurality of light-emitter devices have emitted impulses.

EEE 7 is the system of EEE 1, wherein temporally-adjacent impulses are emitted according to a shot dither schedule, wherein the shot dither schedule comprises a plurality of pseudorandom shot dither times.

EEE 8 is the system of EEE 7, wherein the shot dither schedule repeats after all of the light-emitter devices of the plurality of light-emitter devices have emitted impulses.

EEE 9 is the system of EEE 1, further comprising a receiver unit, wherein the operations further comprise:
  after causing a given light-emitter device to emit an impulse, enabling the receiver unit to detect reflected light during a listening period.

EEE 10 is the system of EEE 9, wherein temporally-adjacent impulses are emitted according to a shot dither schedule, wherein the shot dither schedule comprises a predetermined shot dither time between zero and 50 nanoseconds after a previous listening period.

EEE 11 is the system of EEE 1, wherein between temporally-adjacent impulses emitted from light-emitter devices in a given group, an impulse from a light-emitter device in every other group is timed to occur.

EEE 12 is a system comprising:
  a plurality of light-emitter devices partitioned into a plurality of groups, wherein each light-emitter device is associated with a given group of the plurality of groups, wherein each group comprises light-emitter devices disposed within a respective contiguous region; and
  a controller, wherein the controller carries out operations, the operations comprising:
  causing each of the plurality of light-emitter devices to emit an impulse, wherein the impulse comprises at least one light pulse, wherein the plurality of the impulses is emitted from the plurality of light-emitter devices based on a firing order, wherein between temporally-adjacent impulses emitted from light-emitter devices in a given group, an impulse from a light-emitter device in at least one other group is timed to occur, and wherein between temporally-adjacent impulses emitted from a given light-emitter device, an impulse from at least one other light-emitter device in the same group is timed to occur.

EEE 13 is the system of EEE 12, wherein between temporally-adjacent impulses emitted from light-emitter devices in a given group, an impulse from a light-emitter device in every other group is timed to occur.

EEE 14 is a method comprising:
  causing each light-emitter device of a plurality of light-emitter devices to emit an impulse, wherein the plurality of light-emitter devices are partitioned into a plurality of groups, wherein each group comprises light-emitter devices disposed within a respective contiguous region, wherein each impulse comprises at least one light pulse, wherein the plurality of impulses is emitted from the plurality of light-emitter devices based on a firing order, wherein between temporally-adjacent impulses emitted from light-emitter devices in a given group, an impulse from a light-emitter device in at least one other group is timed to occur, and wherein between temporally-adjacent impulses emitted from a given light-emitter device, an impulse from at least one other light-emitter device in the same group is timed to occur.

EEE 15 is the method of EEE 14, wherein each light-emitter device of the plurality of light-emitter devices is coupled to a corresponding pulser circuit of a plurality of pulser circuits, wherein causing each light-emitter device to emit a plurality of impulses comprises causing the corresponding pulser circuit to provide one or more current or voltage pulses to the light-emitter device.

EEE 16 is the method of EEE 15, further comprising after causing the corresponding pulser circuit to provide the one or more current or voltage pulses, enabling a receiver unit to detect reflected light during a listening period.

EEE 17 is the method of EEE 14, wherein the plurality of groups includes a 3×2 array of groups, and wherein the predetermined group order is configured so as to temporally separate spatially adjacent shots.

EEE 18 is the method of EEE 14, wherein the firing order comprises at least one out-of-order permutation, wherein the at least one out-of-order permutation comprises a next-to-be-fired light-emitter device that is not adjacent to a last-fired light-emitter device as set forth in a nominal firing order.

EEE 19 is the method of EEE 18, wherein the nominal firing order is configured such that spatially-adjacent light-emitter devices within a given group are temporally-adjacent to one another in firing order.

EEE 20 is the method of EEE 14, further comprising repeating the firing order after all of the light-emitter devices of the plurality of light-emitter devices have emitted impulses.

EEE 21 is the method of EEE 14, wherein temporally-adjacent impulses are emitted according to a shot dither schedule, wherein the shot dither schedule comprises a plurality of pseudorandom shot dither times.

EEE 22 is the method of EEE 21, wherein the shot dither schedule comprises predetermined shot dither times between zero and 50 nanoseconds after a previous listening period.

EEE 23 is the method of EEE 21, further comprising repeating the shot dither schedule after all of the light-emitter devices of the plurality of light-emitter devices have emitted impulses.

EEE 24 is the method of EEE 14, wherein between temporally-adjacent impulses emitted from light-emitter devices in a given group, an impulse from a light-emitter device in every other group is timed to occur.

EEE 25 is the method of EEE 14, wherein between temporally-adjacent impulses emitted from a given light-emitter device, an impulse from every other light-emitter device in the same group is timed to occur.

EEE 26 is a device comprising:
a transmitter;
a controller configured to obtain a sequence of scans of a field-of-view (FOV), wherein, for a first scan of the sequence of scans, the controller causes the transmitter to emit a first plurality of impulses toward the FOV, each impulse including at least one light pulse, such that: (i) the transmitter emits one or more impulses in the first plurality of impulses toward a first section of the FOV; (ii) the transmitter emits one or more other impulses in the first plurality of impulses toward a second section of the FOV; and (iii) the transmitter emits each impulse toward the second section of the FOV subsequent to emitting a respective impulse toward the first section of the FOV; and
a receiver that intercepts light from the FOV.

EEE 27 is a system comprising:
a plurality of light-emitter devices that includes at least a first group of light-emitter devices and a second group of light-emitter devices, wherein the system is configured to direct light emitted by the first group of light-emitter devices toward a first section of a field-of-view (FOV) and to direct light emitted by the second group of light-emitter devices toward a second section of the FOV; and
a controller, wherein the controller carries out operations comprising:
causing, in a particular order, each of the plurality of light-emitter devices to emit light,
wherein each of the light-emitter devices in the first group of light-emitter devices is subsequent to, in the particular order, a respective light-emitter device in the second group of light-emitter devices.

The various disclosed aspects and embodiments are for purposes of illustration and are not intended to be limiting, with the true scope being indicated by the following claims.

What is claimed is:

1. A system comprising:
a plurality of light-emitter devices partitioned into a plurality of groups, wherein each light-emitter device is associated with a given group of the plurality of groups, wherein each group comprises light-emitter devices disposed within a respective contiguous region;
a receiver unit; and
a controller, wherein the controller carries out operations, the operations comprising:
causing each light emitter-device of the plurality of light-emitter devices to emit a respective impulse and thereafter enabling the receiver unit to detect reflected light during a corresponding listening period,
wherein each impulse comprises at least one light pulse, wherein the plurality of the impulses is emitted from the plurality of light-emitter devices based on a firing order, wherein between temporally-adjacent impulses emitted from light-emitter devices in a given group, an impulse from a light-emitter device in at least one other group is timed to occur, wherein between temporally-adjacent impulses emitted from a given light-emitter device, an impulse from every other light-emitter device in the same group is timed to occur, wherein temporally-adjacent impulses are emitted according to a shot dither schedule, wherein the shot dither schedule comprises a plurality of shot dither times, and wherein each shot dither time of the plurality of shot dither times corresponds to a waiting time after a prior listening period.

2. The system of claim 1, wherein the plurality of shot dither times comprises a plurality of shot dither times between zero and 50 nanoseconds.

3. The system of claim 1, wherein the shot dither times are predetermined values.

4. The system of claim 1, wherein the plurality of shot dither times comprises a plurality of pseudorandom shot dither times.

5. The system of claim 1, wherein the operations further comprise:
pseudorandomly selecting the shot dither times.

6. The system of claim 1, wherein the operations further comprise:
repeating the shot dither schedule after all of the light-emitter devices of the plurality of light-emitter devices have emitted impulses.

7. The system of claim 1, wherein the plurality of impulses is emitted among the plurality of groups based on a predetermined group order, wherein the predetermined group order is configured so as to temporally separate light pulses emitted by spatially adjacent groups.

8. The system of claim 1, wherein each group of the plurality of groups comprises a plurality of spatially-adjacent light-emitter devices within the respective contiguous region.

9. The system of claim 8, wherein the firing order comprises at least one out-of-order permutation, wherein the at least one out-of-order permutation comprises a next-to-be-fired light-emitter device that is not adjacent to a last-fired light-emitter device as set forth in a nominal firing order, wherein the nominal firing order is configured such that spatially-adjacent light-emitter devices within a given group are temporally-adjacent to one another in firing order.

10. The system of claim 9, wherein the firing order repeats after all of the light-emitter devices of the plurality of light-emitter devices have emitted impulses.

11. A method comprising:
causing each light emitter-device of a plurality of light-emitter devices to emit a respective impulse and thereafter enabling a receiver unit to detect reflected light during a corresponding listening period,
wherein the plurality of light-emitter devices are partitioned into a plurality of groups, wherein each group comprises light-emitter devices disposed within a respective contiguous region, wherein each impulse comprises at least one light pulse, wherein the plurality of impulses is emitted from the plurality of light-emitter devices based on a firing order, wherein between temporally-adjacent impulses emitted from light-emitter devices in a given group, an impulse from a light-emitter device in at least one other group is timed to occur, wherein between temporally-adjacent impulses emitted from a given light-emitter device, an impulse from at least one other light-emitter device in the same group is timed to occur, wherein temporally-adjacent impulses are emitted according to a shot dither schedule, wherein the shot dither schedule comprises a plurality of shot dither times, and wherein each shot dither time of the plurality of shot dither times corresponds to a waiting time after a prior listening period.

12. The method of claim 11, wherein the plurality of shot dither times comprises a plurality of shot dither times between zero and 50 nanoseconds.

13. The method of claim 11, wherein the shot dither times are predetermined values.

14. The method of claim 11, wherein the plurality of shot dither times comprises a plurality of pseudorandom shot dither times.

15. The method of claim 11, further comprising:
pseudorandomly selecting the shot dither times.

16. The method of claim 11, further comprising:
repeating the shot dither schedule after all of the light-emitter devices of the plurality of light-emitter devices have emitted impulses.

17. The method of claim 11, wherein the plurality of impulses is emitted among the plurality of groups based on a predetermined group order, wherein the predetermined group order is configured so as to temporally separate light pulses emitted by spatially adjacent groups.

18. The method of claim 11, wherein each group of the plurality of groups comprises a plurality of spatially-adjacent light-emitter devices within the respective contiguous region.

19. The method of claim 18, wherein the firing order comprises at least one out-of-order permutation, wherein the at least one out-of-order permutation comprises a next-to-be-fired light-emitter device that is not adjacent to a last-fired light-emitter device as set forth in a nominal firing order, wherein the nominal firing order is configured such that spatially-adjacent light-emitter devices within a given group are temporally-adjacent to one another in firing order.

20. The method of claim 19, wherein the firing order repeats after all of the light-emitter devices of the plurality of light-emitter devices have emitted impulses.

* * * * *